INVENTOR.
John C. Bellamy.
BY Thiess, Olson, Mecklenburger, von Holst, & Coltman. Attys.

INVENTOR.
John C. Bellamy
BY Thiess, Olson, Mecklenburger, von Holst & Coltman
Attys.

United States Patent Office 3,017,111
Patented Jan. 16, 1962

3,017,111
HIGH OUTPUT TORQUE FUNCTION GENERATOR UTILIZING A PUNCHED TAPE INPUT

John C. Bellamy, Chicago, Ill., assignor, by mesne assignments, to Cook Electric Company, Chicago, Ill., a corporation of Delaware Filed Oct. 12, 1956, Ser. No. 615,648
24 Claims. (Cl. 235—197)

This invention relates to an improved data processing system and more particularly to a system for generating a shaft position related to a known variable and a further shaft position related to a function of said variable.

Heretofore it has been considered difficult or impossible to generate accurately a shaft position representing a data value in application which require that the shaft be driven with a substantial torque. As a result, the problem of translating the diminutive data outputs of meter movements, thermocouples, pressure gauges, strain gauges, and the like into a corresponding rotative position of a loaded shaft has been almost insurmountable, and all such systems necessarily have incorporated amplifiers of considerable complexity and power in order to produce the desired results. Such amplifiers usually entail the use of complex, unreliable, and inherently-inaccurate electronic circuitry.

Furthermore, it has heretofore been necessary to utilize the amplified data signal to produce a shaft position or the equivalent of a shaft position before data could be recorded. This conversion from an analogue to a shaft position information form usually introduced further error and rendered the systems subject to further instability and maintenance problems. Having thus generated a shaft position related to a variable, it was found necessary to calibrate the output, correcting for inherent errors and nonlinearities in the amplifier and converter portions of the system. It was customary to make calibrations manually, thereby requiring the expenditure of excessive time by highly-skilled operators.

It is therefore one object of this invention to provide improved means for directly establishing shaft positions representing increments or decrements in an analogue-data input signal.

It is another object of this invention to provide improved apparatus capable of applying a high torque to position a shaft in response to low-power, analogue-data inputs.

It is a still further object of this invention to provide an improved data processing system wherein a shaft is incrementally moved to a plurality of predetermined positions in accordance with a continuous analogue data signal.

It is another object of this invention to provide means for directly calibrating an analogue data signal while converting said signal into an incremental shaft position.

It is a still further object of this invention to provide an incremental non-redundant record of a functional operator which may be utilized to calibrate a system for recording data inputs.

It is still a further object of this invention to provide apparatus for simultaneously converting an analogue data input into a unitary data form and into unitary form representing a function of said data.

It is still another object of this invention to provide an improved form of preserving data which is unitary, non-redundant, and capable of efficient and accurate processing.

Further and additional objects of this invention will become manifest from a consideration of this specification, the accompanying drawings and the appended claims.

In one form of this invention a mechanism is provided which will incrementally position a first output shaft in accordance with a measured variable and will position a second output shaft incrementally in accordance with a function of said variable. More particularly, the apparatus of this invention includes a continuously driven power shaft capable of stepping a first output, or storage, shaft in accordance with a data input, said power shaft further driving an output shaft incrementally in accordance with a function of the data input.

For a more complete understanding of this invention, reference will now be made to the accompanying drawings wherein.

Figures 1, 3, 4, 5:
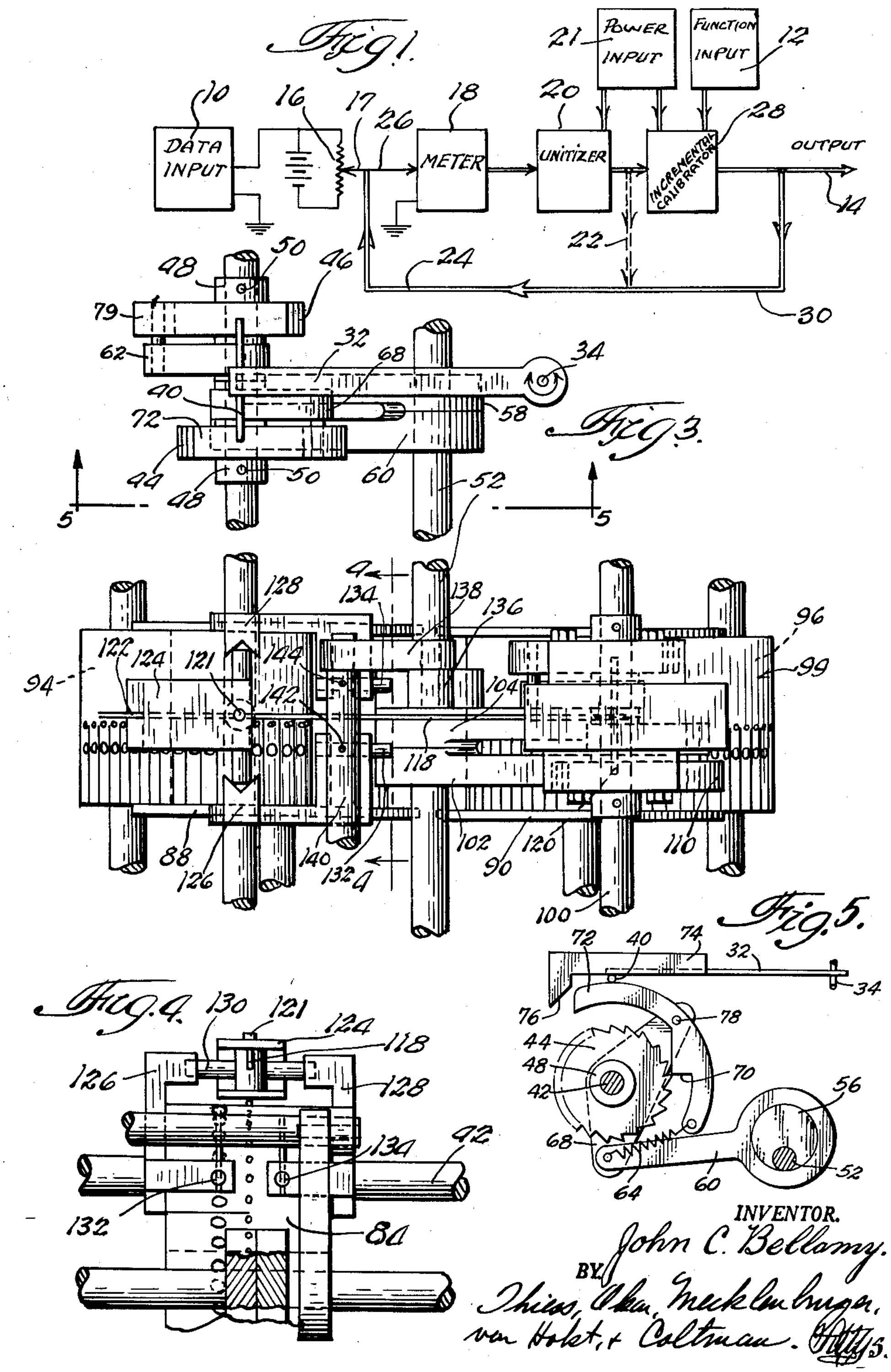
FIGURE 1 is a block diagram of one embodiment of this invention.
FIG. 3 is a plan view of the structure illustrated in FIG. 2.
FIG. 4 is a fragmentary view of a portion of the embodiment of FIG. 2 taken on the line 4—4 of FIG. 3.
FIG. 5 is a fragmentary elevational sectional view taken generally along the line 5—5 in FIG. 3.

Referring now to the drawings and more particularly to FIG. 1, one particular embodiment of the invention is illustrated in block form and includes a data input 10 and a function input 12 which are combined in a unique manner to provide a unitary calibrated output 14. The data input 10 might be any source of information, but preferably it is one represented by a mechanical position, variable voltage or current. For example, the block 10 might be a thermocouple, a variable potentiometer, a photocell or the like. The data signal from the input 10 is combined subtractively with the output of a differential device 16, and the combined error or difference signal is fed to a meter 18 over a line 26. It will be understood that the voltage from the differential device 16 tends to nullify the data input voltage. The particular differential device 16 will be determined by the available information form. When, as in the present case, the data input is in the form of a variable voltage, the differential device 16 may take the form of a variable potentiometer having a wiper 17 operable by mechanical feedback, as will be described in greater detail presently. The meter movement 18 may be any conventional electric meter having a D'Arsonval movement, an iron vane movement, or the like. Any meter or other device capable of producing mechanical movement of an arm or lever may be employed.

Mechanical movement of the indicator arm of meter 18 is utilized to control incrementally a unitizer 20 which will produce incremental rotational changes in a shaft position. The shaft will move bidirectionally in predetermined uniform increments corresponding to incremental changes in the data value. A continuously driven power shaft comprising power input 21 is employed to drive unitizer 20 with a substantial torque. A mechanical feedback path or connection may be provided along a broken line 22 and a solid line 24 to the wiper 17 of the feedback potentiometer 16. In a simple yet advantageous arrangement, the output or storage shaft of the unitizer 20 directly drives the wiper 17 of the feedback potentiometer 16 so that the shaft position of the unitizer will be compared with the data input. It will be apparent that this arrangement constitutes a null-seeking servomechanism in which the error signal on the line 26 to the meter 18 approaches zero whenever the position of the unitary storage shaft corresponds to the data value represented by the data input.

As thus far described, apparatus is provided for producing a unitary shaft position corersponding to a data input. The output shaft of unitizer 20 may be readily incorporated into a binary, decimal, or unitary counting or recording device. Thus a simple conversion from analog to digital form may be performed.

If it is desired to provide a further functional operation on the data input, incremental calibrator 28 and function input 12 may be utilized. An alternate feedback loop is provided by solid line 30 and line 24 whereby the servomechanism will null on the function of the data value rather than on the data value itself. Thus, for example, if the data input 10 were a continuous linear variable having a voltage output proportional to time and the function input 12 were a logarithmic function, use of feedback loops 22 and 24 would provide a linear representation of the value in the storage shaft of unitizer 20 and would provide a logarithmic output at the output shaft 14 of calibrator 28. Conversely, when using the same data input and function input and the feedback loop 30 and 24, the storage shaft of unitizer 20 will assume positions corresponding to antilogarithmic values of the data input, while output shaft 14 of calibrator 28 will comprise a linear representation of the data input 10. The particular selection of a feedback loop will depend upon the data input and the particular function being utilized as a function input as well as the particular data form ultimately desired.

Figure 2:
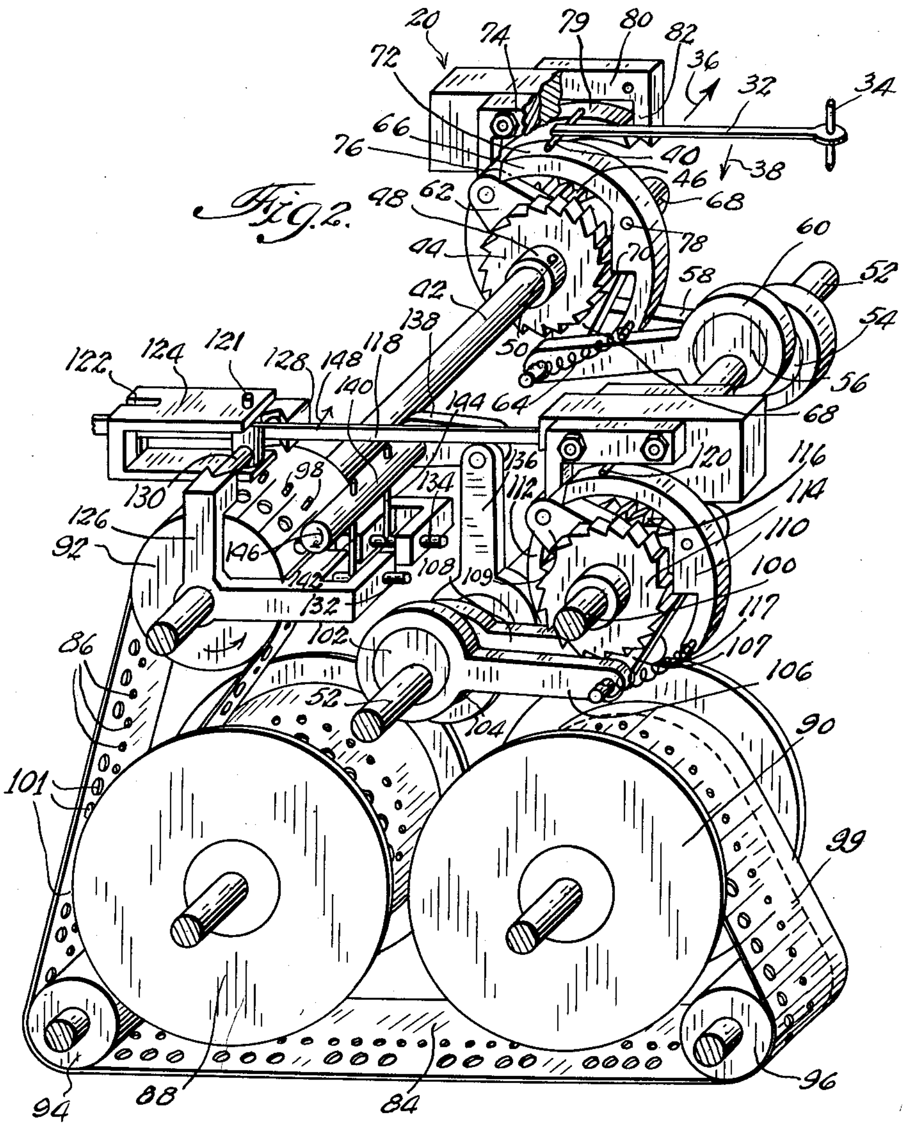
FIG. 2 is a partial perspective view of a portion of the embodiment of FIG. 1.

Referring now to FIG. 2, portions of the system described with regard to FIG. 1 will be described in greater detail. The particular data input differential device 16 and the major portion of meter 18 have been eliminated for simplicity. However, the meter indicator 32 and pivot 34 are illustrated. The meter 18 will be a bidirectional device whereby both magnitude and polarity of the data input or data error will be indicated by movement of needle 32. By way of example, it will be assumed that for increasing positive data values the needle 32 will move in the direction indicated by arrow 36, while for negative data value the needle will move in the direction of arrow 38.

Wherever the term data input or data value is used herein it will be understood that in utilizing the differential device 16 the values indicated by meter 18 are error signals rather than actual data inputs. However, assuming that the system is initially in balance, a positive change in the input will also produce a positive change in the error value and consequently the needle movements will correspond to the data value in each case. Needle 32 has an interference bar 40 secured at its free end in such a manner that movement of the needle and interference bar will control the movement of a storage shaft 42.

Storage shaft 42 has a pair of opposed ratchet wheels 44 and 46 mounted thereon and fixed in position by associated collars 48 and set screws 50. A continuously rotated power shaft 52, the output of power input 21, is mounted in spaced parallel relationship to storage shaft 42. The shaft 52 carries two eccentric cams 54 and 56, which support and continuously reciprocate two driving arms 58 and 60. Each of the driving arms 58 and 60 is pivotally secured to an associated bell crank 68 and 62, the bell cranks 68 and 62 being freely rotatable on storage shaft 42. Thus continuous reciprocation of eccentric arms 58 and 60 will produce a continuous rocking motion of bell cranks 68 and 62.

A driving detent 66 is pivotally mounted on the bell crank support 68 and is normally urged by a coil spring 64 in a direction whereby a latch portion 70 of detent 66 will engage one of the teeth of ratchet wheel 44. However, latch portion 70 is normally maintained out of engagement with the associated ratchet wheel 44 by interference bar 40 which is disposed between the curved smooth face 72 of detent 66 and a backing strip 74. During each reciprocation of eccentric arm 60, the detent 66 will be rotated in a counterclockwise direction whereby the smooth curved surface 72 is engaged by a camming surface 76 formed on backing strip 74. When thus engaged, the surface 72 is maintained in spaced relationship from interference bar 40 whereby the needle 32 is free to move in response to torque applied thereto by the movement of meter 18.

In the event that a positive error is registered by meter 18, needle 32 will move in the direction of arrow 36 out of its normal position in which interference bar 40 is between curved surface 72 and backing strip 74. Thus, on the next half cycle of eccentric arm 60, surface 72 will slide out of engagement with cam surface 76 while moving in a clockwise direction whereby detent 66 will freely rotate about pivot 78 to a position where latch 70 engages a tooth of ratchet wheel 44 under the influence of spring 64. Thus storage shaft 42 will be stepped through one incremental position in a clockwise direction indicating a positive increase in the data value of one unit. Upon the next half cycle, surface 72 will again engage cam surface 76 whereby interference bar 40 may again assume the neutral position between surface 72 and backing strip 74 in the event that the single unitary step of storage shaft 42, when fed back to the meter input, is sufficient to balance the increased positive data value. Obviously, if the single shaft step is inadequate for this purpose, the meter indicator 32 will remain in the displaced position whereby the interference bar 40 will be removed from its normal position, thus permitting a second step of storage shaft 42.

It will be clear that bushings and pillow blocks for the various rotating shafts will be incorporated in a complete embodiment of this invention as well as means for resiliently maintaining the storage shaft 42 in a given position following stepping motion by detent 66. However, such details have been omitted from the disclosed embodiment to further an understanding of the fundamental structure and principles involved.

As already stated, a second ratchet wheel 46 is provided for response to negative data values or data changes. A second detent 79 supported bell crank 62 and backing strip 80 having a cooperating cam surface 82 are provided and the device will operate for negative data values in a manner identical to that described above. Each rotation of power shaft 52 will reciprocate arm 58 and thus rock pivotally connected bell crank 62. In the event needle 32 indicates a negative error by shifting in the direction of arrow 38, detent 79 will be freed to engage ratchet wheel 46. However, in that event, reciprocatory movement of driving arm 58 will produce counterclockwise movement of storage shaft 42.

It will be clear from the foregoing description that the position of shaft 42 is directly related to the magnitude of data input 10 provided the feedback loop is completed from shaft 42 to meter 18. As the meter is used merely as a latch or trigger controlling movement of the storage shaft 42 while that shaft is driven directly from power shaft 52 it will be apparent that substantial torque may be applied to storage shaft 42 whereby substantial work may be accomplished by the storage shaft. This provides a direct and amplified unitary representation of the information being indicated on the low torque, low power, meter needle 32. In addition to providing very substantial effective amplification of the signals the device thus far described converts the purely analogue information supplied to meter movement 18 into a unitary data form. That is, each step of shaft 42 represents an increment of the maximum data magnitude and the total number of increments will obviously represent the total data magnitude. Thus, each position of storage shaft 42 might control subsequent digital apparatus without further conversion. Such apparatus includes printers, punch card apparatus, digitally-responsive computers, and the like.

It is usually desirable to calibrate the output of devices of this type to compensate for nonlinearities or inherent errors in the processing equipment. This has heretofore been accomplished by either manual correction or complex compensating apparatus. By this invention calibration is directly accomplished by the function input recorded on elongate tape 84. Tape 84 has a series of evenly spaced apertures 86 formed therein. The tape is normally stored on a pair of storage reels 88 and 90 and extends from reel 88 over a driving drum 92 fixed to storage shaft 42 and a pair of rotatable idler rollers 94 and 96. Pins 98 are fixed in drum 92 whereby they engage apertures 86 in tape 84 to provide positive and continuous driving engagement between drum 92 and the tape. Spaced along a base line, parallel to one edge of the tape are a series of information apertures 101. These apertures may assume predetermined ones of a series of uniformly spaced positions along the length of the tape. All of the apertures are discrete and identical and may be sensed by a cooperating apparatus in a manner to be described. As will be described, the illustrated tape has recorded thereon a functional operator of constant polarity. If a bipolar operator is utilized a second parallel row of apertures will be provided along the base indicated by broken line 99.

The drum 92 has a parallel row of apertures formed therein which accurately align with the positions along tape 84 where apertures 101 may appear. In the event that an aperture 101 appears in tape 84 at a sensing station a step of storage shaft 42 will produce a corresponding step in an output shaft 100. This driving connection is provided by the following apparatus. An additional pair of eccentrics 102 and 104 are mounted on power shaft 52 and connecting arms 106 and 108 are reciprocally driven thereby. The arms 106 and 108, in turn, are pivotally connected to bell cranks 107 and 109 to drive detents 110 and 112 in a manner identical to that described above with regard to the unitizer 20.

The output shaft 100 has a pair of opposed ratchet wheels 114 and 116 secured thereto for cooperation with detents 110 and 112, respectively, whereby movement of a control arm 118 carrying an interference bar 120 will produce unitary bidirectional movement of output shaft 100 in a manner identical to that described above with regard to storage shaft 42. Briefly, that mechanical action is as follows: Detents 110 and 112 are normally urged into engagement with corresponding ratchets 114 and 116 by coil springs 117. However, these are maintained in spaced relationship by interference bar 120. Whenever control arm 118 is displaced, one of the detents 110 or 112 is free to engage the associated ratchet, thus producing a single incremental step of output shaft 100. In the event that the interference bar 120 remains displaced, the output shaft will continue to move in incremental steps.

The control arm 118 is rotatable about pivot 121 and is maintained in a slot 122 formed in mounting bracket 124. The arm is driven by a pair of bell cranks 126 and 128 pivotally mounted on storage shaft 42 and engaging a transverse pivotally mounted rod 130 integrally formed with pivot pin 121. Each bell crank 126 and 128 has a yoke portion which carries a drive pin 132 and 134, respectively. Pin 132 may enter the apertures formed in drum 92 and tape 84 during the cycle of this apparatus. Pin 134 will enter similar apertures along the base line 99 of tape 84 when the tape represents a function having both positive and negative values. The pins are driven into engagement with tape 84 and consequently drum 92 once during each cycle of shaft 52 by an eccentric arm 136 and connecting link 138. Vertical movement of arm 136 produces rotative movement of link 138 about an axle 140. Axle 140 carries a pair of resilient pins 142 and 144 which pass through enlarged apertures in corresponding drive pins 132 and 134, respectively. Thus, upon each cycle of drive shaft 52, axle 140 is pivoted in the direction indicated by arrow 146 whereby resilient pins 142 and 144 force drive pins 132 and 134 against drum 92. If an aperture appears in the function record contained in tape 84, the corresponding pin 132 or 134 will enter the aligned aperture in drum 92, providing driving connection between the drum and the corresponding bell crank 126 or 128. This will pivot rod 130, causing control arm 118 to be displaced permitting one step of output shaft 100.

The functional operator illustrated on the tape 84 is intended as a calibration curve for the particular meter movement and sensing device being utilized. Thus, the tape merely compensates for slight nonlinearities in the data information recorded and registered by storage shaft 42. Thus, periodically an aperture is omitted from the otherwise continuous row of apertures whereby the positions of output shaft 100 and storage shaft 42 will be directly related but output shaft 100 will not be subject to predetermined ones of the storage shaft steps to compensate for inherent nonlinearities in the system.

Such data compensation in which all apertures in tape 84 occur in a single row are designated monotone operations. In the event that the functional operator will produce a negative displacement of output shaft 100 for a positive displacement of storage shaft 42 the second row of apertures will appear in tape 84 in alignment with drive pin 134 as already described. In that event, appearance of an aperture at the sensing position in alignment with pin 134 will produce rotation of bell crank 138 and consequently displacement of arm 118 in the direction indicated by arrow 148. This will shift interference bar 120 in such a manner that output shaft 100 will be stepped one position in a clockwise position for a counterclockwise step of storage shaft 42, thus producing an effective sign reversal. Thus, for example, a linear or exponential input to storage shaft 42 may receive sinusoidal modulation by appropriate disposition of apertures 101 in tape 84.

It is important in this invention that the information contained in tape 84 is unitary or incremental and is also non-redundant. The design of a system of the type described herein is based on the maximum resolution required of the data. This maximum resolution, in turn, is determinative of the incremental value represented by a step of storage shaft 42 and consequently the value of one position along tape 84. Furthermore, any given position along tape 84 will render absolute information provided only that the apparatus utilizing the tape has previously recorded the historical developments preceding the arrival of that particular data sample at the sensing position. This is inherent in a non-redundant data system. At each position along tape 84 an aperture is either absent or present in one of two positions indicating that since the last data position there has been no change in the data value, a positive unitary incremental data change in the data value represented by one step of the unitary system representing the maximum resolution of the system or a similar negative unitary change of the data.

It should be apparent from the foregoing description that if the position of storage shaft 42 is utilized to generate a feedback voltage for differential 16, then the position of storage shaft 42 will be directly related to the data input 10. If, on the contrary, output shaft 100 is utilized for the generation of a feedback signal, the position of this will be directly related to the data values being sensed. In either event, the position of the shaft not utilized for feedback purposes will represent the function or antifunction of the data value as determined by the matter recorded on tape 84. Furthermore, it will be apparent from the foregoing that substantial torque may be provided in storage shaft 42 and output shaft 100 even though these shafts are controlled by delicate meter movements and the like. It will be apparent that the described structure may be readily modified by one skilled in the art to utilize the principles taught herein and all such variations are clearly within the scope of this invention.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. Data processing apparatus for producing a shaft displacement corresponding to a function of a data input comprising a first continuously rotating shaft, a second rotatable shaft, connecting means driven by said first shaft to intermittently move said second shaft in a clockwise direction, means controlled by said data input to control said clockwise connecting means for data inputs of a given polarity, connecting means driven by said first shaft to intermittently move said second shaft in a counterclockwise direction, means controlled by said data input to control said counterclockwise connecting means for data inputs of the opposite polarity, a third rotatable shaft, drive means driven by said first shaft to intermittently move said third shaft in a given direction, second drive means driven by said first shaft to intermittently move said third shaft in the opposite direction, feedback means to actuate said data input in accordance with the position of said third shaft, and control means controlling said drive means to selectively actuate either one of said drive means periodically, said control means including an incrementally coded data storage device connected to said second shaft for movement therewith past a sampling station, and means at said station for sampling said incrementally coded data to selectively actuate either one of said drive means periodically.

2. Data processing apparatus for producing a shaft displacement corresponding to a function of a data input comprising: a source of rotative power, a continuously rotatable power shaft coupled to the said power source, a source of input data, a rotatable storage shaft, connecting means driven by said power shaft for stepping said storage shaft incrementally in a given direction, connecting means driven by said power shaft for stepping said storage shaft incrementally in the opposite direction, bidirectional control means responsive to said data input for selectively and successively actuating said connecting means, a rotatable output shaft, drive means continuously driven by said power shaft for stepping said output shaft in a given direction, drive means continuously driven by said power shaft for stepping said output shaft in the opposite direction, and means intermittently actuated by said storage shaft to produce movement of said output shaft corresponding to said function.

3. Data processing apparatus for producing a shaft displacement corresponding to a function of a data input comprising: a source of rotative power, a continuously rotatable power shaft coupled to the said power source, a source of input data, a rotatable storage shaft, connecting means driven by said power shaft for stepping said storage shaft incrementally in a given direction, connecting means driven by said power shaft for stepping said storage shaft incrementally in the opposite direction, bidirectional control means responsive to said data input for selectively and alternately actuating said connecting means, a rotatable output shaft, drive means continuously driven by said power shaft for stepping said output shaft in a given direction, drive means continuously driven by said power shaft for stepping said output shaft in the opposite direction, output control means intermittently actuatable by said storage shaft to control said drive means and produce movement of said output shaft, and an elongate incremental record of said function mounted for movement past a sensing station to control actuation of said control means by said storage shaft, said storage shaft effecting intermittent movement of said record whereby said output shaft is intermittently moved in accordance with said function and said data input.

4. Data processing apparatus for producing a shaft displacement corresponding to a function of a data input comprising a continuously rotatable power shaft, a rotatable storage shaft, connecting means driven by said power shaft for stepping said storage shaft incrementally in a given direction, connecting means driven by said power shaft for stepping said storage shaft incrementally in the opposite direction, bidirectional control means responsive to said data input for selectively and alternately actuating said connecting means, a rotatable output shaft, drive means continuously driven by said power shaft for stepping said output shaft in a given direction, drive means continuously driven by said power shaft for stepping said output shaft in the opposite direction, an apertured drum secured to said storage shaft, an elongate incremental record of said function in the form of a longitudinal row of irregularly spaced apertures, the said record mounted for driving engagement with said drum and whereby said longitudinal row of irregularly spaced apertures is aligned with apertures in said drum, output control means engageable with aligned apertures in said drum and record to control said drive means when so engaged and produce movement of said output shaft corresponding to movement of said storage shaft.

5. Apparatus for producing incremental rotational changes in the position of an output shaft in response to a data input signal comprising a continuously rotating power shaft, eccentric means continuously driven by said power shaft to produce continuous reciprocatory motion, a rotatable storage shaft, first ratchet means and cooperating detent for moving said storage shaft in a given direction, reverse ratchet means and cooperating detent for moving said storage shaft in the opposite direction, said ratchet means being mounted on said storage shaft and said cooperating detents being driven by said eccentric means in oscillatory rotative movement about the axis of said storage shaft, resilient means urging said cooperating detents into engagement with the associated ratchets, and a bidirectional control means normally disposed in juxtaposition with said detents to maintain said detents in spaced relationship from the associated ratchets against said resilient means, said control means moving in accordance with the magnitude and polarity of said data input whereby said detents are intermittently, selectively and alternately engageable with the corresponding ratchets to produce storage shaft displacements related to said data input.

6. The apparatus of claim 5 wherein said bidirectional control means is an electric meter in which the movable meter indicator interferes with either one of said detents in accordance with the data magnitude and polarity.

7. The apparatus of claim 5 wherein said bidirectional control means is a mechanically shifted bidirectional interference device positioned in accordance with said function of a data input.

8. Data processing apparatus for producing a shaft displacement corresponding to a function of a data input comprising a continuously rotating power shaft, eccentric means continuously driven by said power shaft to produce continuous reciprocatory motion, a rotatable storage shaft, first ratchet means and cooperating detent for moving said storage shaft in a given direction, reverse ratchet means and cooperating detent for moving said storage shaft in the opposite direction, said ratchet means being mounted on said storage shaft and said cooperating detents being driven by said eccentric means in oscillatory rotative movement about the axis of said storage shaft, resilient means urging said cooperating detents into engagement with the associated ratchets, a bidirectional control means normally disposed in juxtaposition with said detents to maintain said detents in spaced relationship from the associated ratchets against said resilient means, said control means moving in accordance with the magnitude and polarity of said data input whereby said detents are intermittently, selectively and alternately engageable with the corresponding ratchets to produce storage shaft displacements related to said data input, drum means fied onx said shaft having a plurality of uniformly spaced effects circumferentially disposed thereon, an elongate record in driving engagement with said drum and having corresponding effects thereon spaced in accordance with said function, means to sense the coincidence of a drum effect and a record effect to generate a data output representing said function of the data input, and an output shaft positioned in accordance with said data output.

9. Data processing apparatus for producing a shaft displacement corresponding to a function of a data input comprising a continuously rotating power shaft, eccentric means continuously driven by said power shaft to produce continuous reciprocatory motion, a rotatable storage shaft, first ratchet means and cooperating detent for moving said storage shaft in a given direction, reverse ratchet means and cooperating detent for moving said storage shaft in the opposite direction, said ratchet means being mounted on said storage shaft and said cooperating detents being driven by said eccentric means in oscillatory rotative movement about the axis of said storage shaft, resilient means urging said cooperating detents into engagement with the associated ratchets, a bidirectional control means normally disposed in juxtaposition with said detents to maintain said detents in spaced relationship from the associated ratchets against said resilient means, said control means moving in accordance with the magnitude and polarity of said data input whereby said detents are intermittently, selectively and alternately engageable with the corresponding ratchets to produce storage shaft displacements related to said data input, drum means fixed on said shaft having a plurality of uniformly spaced effects circumferentially disposed thereon, an elongate record in driving engagement with said drum and having corresponding effects thereon spaced in accordance with said function, output control means sensing the coincidence of a drum effect and a record effect, a rotatable output shaft, output eccentric means continuously driven by said power shaft to produce continuous reciprocatory motion, and bidirectional means connecting said output eccentric means to said output shaft to produce intermittent movement of said output shaft in a direction and at spaced intervals controlled by said output control means.

10. Data processing apparatus for producing a shaft displacement corresponding to a function of a data input comprising a continuously rotating power shaft, eccentric means continuously driven by said power shaft to produce continuous reciprocatory motion, a rotatable storage shaft, first ratchet means and cooperating detent for moving said storage shaft in a given direction, reverse ratchet means and cooperating detent for moving said storage shaft in the opposite direction, said ratchet means being mounted on said storage shaft and said cooperating detents being driven by said eccentric means in oscillatory rotative movement about the axis of said storage shaft, resilient means urging said cooperating detents into engagement with the associated ratchets, a bidirectional control means normally disposed in juxtaposition with said detents to maintain said detents in spaced relationship from the associated ratchets against said resilient means, said control means moving in accordance with the magnitude and polarity of said data input whereby said detents are intermittently, selectively and alternately engageable with the corresponding ratchets to produce storage shaft displacements related to said data input, drum means fixed on said shaft having a plurality of uniformly spaced apertures circumferentially disposed thereon, an elongate record in driving engagement with said drum and having corresponding apertures thereon spaced in accordance with said function, output control means sensing the coincidence of a drum aperture and a record aperture, a rotatable output shaft, output eccentric means continuously driven by said power shaft to produce continuously reciprocatory motion, and bidirectional means connecting said output eccentric means to said output shaft to produce intermittent movement of said output shaft in a direction and at spaced intervals controlled by said output control means.

11. Data processing apparatus for producing a shaft displacement corresponding to a function of a data input comprising a continuously rotating power shaft, eccentric means continuously driven by said power shaft to produce continuous reciprocatory motion, a rotatable storage shaft, first ratchet means and cooperating detent for moving said storage shaft in a given direction, reverse ratchet means and cooperating detent for moving said storage shaft in the opposite direction, said ratchet means being mounted on said storage shaft and said cooperating detents being driven by said eccentric means in oscillatory rotative movement about the axis of said storage shaft, resilient means urging said cooperating detents into engagement with the associated ratchets,, a bidirectional control means normally disposed in juxtaposition with said detents to maintain said detents in spaced relationship from the associated ratchets against said resilient means, said control means moving in accordance with the magnitude and polarity of said data input whereby said detents are intermittently, selectively and alternately engageable with the corresponding ratchets to produce storage shaft displacements related to said data input, drum means fixed on said shaft having a plurality of uniformly spaced apertures circumferentially disposed thereon, an elongate record in driving engagement with said drum and having apertures thereon spaced in accordance with said function, output control means having a portion rotatably mounted on said storage shaft and periodically engageable with said record whereby engagement with a record portion having an aperture in coincidence with an aperture of said drum will produce an angular displacement of said output control means, output eccentric means continuously driven by said power shaft to produce continuous reciprocatory motion, a rotatable output shaft, first output ratchet means and cooperating detent for moving said output shaft in a given direction, reverse output ratchet means and cooperating detent for moving said output shaft in the opposite direction, said ratchet means being mounted on said output shaft and said cooperating detents being driven by said output eccentric means in oscillatory rotative movement about the axis of said output shaft, and resilient means urging said cooperating output detents into engagement with the associated ratchets, said output control means being normally disposed in juxtaposition with said output detents to maintain said output detents in spaced relationship from the associated ratchets against said resilient means whereby said output detents are intermittently, selectively and alternately engageable with the corresponding output ratchets to produce output shaft displacements corresponding to said function.

12. Apparatus for translating information distributed incrementally along an elongated record into incremental rotations of a shaft, the said apparatus comprising: a source of motive power; an elongated record having information distributed at intervals in a longitudinal direction; means for sensing the presence of the said information; means for producing relative movement between the said record and the said sensing means; and means coupled, respectively, to the said power source, the said shaft, and the said sensing means for rotating the said shaft incrementally in response to the said information, the said rotating means including an interference bar having one end pivotally-mounted on, and responsive to, the said sensing means.

13. Apparatus for converting a quantity representing analogue data into an incremental output quantity representing a non-redundant, unitary-data approximation of the said analogue quantity, the said apparatus comprising in combination: a source of a data-input quantity; a source of motive power; a first rotatable shaft, first means coupled, respectively, to the said data source, the said motive-power source, and the said first shaft for rotating the said first shaft incrementally in response to the said data quantity; a second rotatable shaft; and second means coupled, respectively, to the said motive-power source and to the said first and second shafts for rotating the said second shaft incrementally in accordance with a predetermined function.

14. Apparatus as represented in claim 13 wherein the said first means comprises: first and second eccentric arms; a power shaft coupled to the said motive power source; first and second means eccentrically coupling one of the ends of each of the said first and second eccentric arms, respectively, to the said power shaft such that the said arms are reciprocated back and forth in opposite directions whenever rotation of the said power shaft occurs; first and second ratchet wheels coupled fixedly to the said first shaft; first and second mechanisms coupled, respectively, to the other end of each of the said first and second eccentric arms, the said first mechanism including a detent and means mounting the said detent for retractably engaging and imparting an incremental rotative movement to the said first ratchet wheel and hence, the said first shaft in one direction whenever the said first mechanism is moved in one direction by the said first eccentric arm, and the said second mechanism including a detent and means mounting the said detent for retractably engaging and imparting an incremental movement to the said second ratchet wheel and, hence, the said first shaft in the opposite direction whenever the said second mechanism is moved in the opposite direction by the said second eccentric arm; and means coupled to the said data source and to the said first and second mechanisms for controlling, selectively, the occurrence of engagement of the said first and second detents with the said first and second ratchet wheels respectively.

15. Apparatus as represented in claim 14 wherein the said engagement-controlling means comprises the indicator arm of a meter.

16. Apparatus as represented in claim 13 wherein the said second means comprises: an elongated record having information effects distributed in a longitudinal direction at intervals representing at least approximately a predetermined function of a variable; means for sensing the said information effects disposed in sensing relation with respect to the said record, the said sensing means including means for producing a control quantity in response to the said information effects; means coupled to the said first shaft for moving the said record with respect to the said sensing means such that the said control quantity is produced at intervals determined by the incrementally-rotational motion of the said first shaft; and means coupled, respectively, to the said sensing means, the said motive-power source, and the said second shaft for rotating the said second shaft in response to the said information effects through increments representing the said predetermined function.

17. Apparatus as represented in claim 13 wherein the said data source comprsies: means for supplying a first quantity; means coupled to the said first shaft for developing a second quantity representing the existing incremental angular position of the said first shaft; means utilizing the said first and second quantities to develop an error quantity having a polarity representing the direction of, and a magnitude proportion to, any discrepancy existing between the said first and second quantities.

18. Apparatus as represented in claim 17 wherein the said second-quantity developing means is coupled to the said second shaft.

19. Apparatus as represented in claim 17 wherein the said first quantity is an electrical voltage of variable magnitude, the said second quantity is a mechanical movement, and the said utilizing means comprises: a potentiometer having a voltage-dropping element coupled between the said means for supplying a first quantity and a ground source of constant reference potential and a voltage pick-off arm coupled mechanically to the said second quantity source and coupled electrically to a meter having an indicator arm.

20. Apparatus as represented in claim 19 wherein the said second-quantity developing means is coupled to the said second shaft.

21. A closed-loop servo system wherein a loaded output element may be positioned to follow incrementally the variations in an analogue-data input signal, the said system comprising: a source of an analogue data signal; an output element; means coupled to the said signal source and to the said output element for developing an error quantity having a polarity representing the direction of, and a magnitude proportional to, any discrepancy between the position of the said output element and a position represented by the said signal; a source of motive power; means for disengageably coupling the said output element to the said power source, the said coupling means including further means for limiting movements of the said output element to increments of predetermined size; and means responsive to the said error quantity for actuating the said coupling means, such that any existing discrepancy is minimized.

22. A closed-loop servo system as represented in claim 21 further comprising means coupled, respectively, to the said power source, the said output element, and to a driven element for positioning the said driven element incrementally in accordance with a predetermined function, the said means including an elongated record having information effects incrementally disposed in a longitudinal direction to approximate, at least, a desired function.

23. Apparatus for producing incremental displacements of an output shaft in response to a data input signal comprising: a source of data signal having a datum level; a source of rotative power; a first rotatable shaft coupled to the said power source; a rotatable output shaft; first means coupled to the said signal source and the said first and output shafts for producing intermittent clockwise rotation of said output shaft whenever the said data-signal varies from the datum level in one direction; and second means coupled to the said signal source and the said first and output shafts for producing intermittent counterclockwise rotation of said output shaft whenever the said data signal varies from the datum level in the other direction.

24. Apparatus for producing incremental displacements of an output shaft in response to a predetermined function of a data input signal comprising: a source of data signal normally varying in either direction from a datum level; a source of rotative power; a continuously-rotatable drive shaft coupled to the said power source a second rotatable shaft; first means coupled to the said signal source and to the said first and second shafts for producing intermittent clockwise rotation of said second shaft whenever the said data signal varies from the datum level in one direction; second means coupled to the said signal source and to the said first and second shafts for producing intermittent counterclockwise rotation of the said second shaft whenever the said data signal varies from the datum level in the other direction; a rotatable output shaft; third means coupled to the said second shaft for developing a function output; fourth means coupled to the said third means and the said output shaft for producing intermittent clockwise rotation of the said output shaft in response to the function output of said third means; and fifth means coupled to the said third means and the said output shaft for producing intermittent counterclockwise rotation of the said output shaft in response to the function output of said third means.

References Cited in the file of this patent

UNITED STATES PATENTS

| | | |
|---|---|---|
| 931,753 | Graham | Aug. 24, 1909 |
| 1,058,922 | Tassey | Apr. 15, 1913 |
| 2,184,158 | Whitney et al. | Dec. 19, 1937 |
| 2,581,109 | Kenngott | Jan. 1, 1952 |
| 2,650,500 | Stibitz | Sept. 1, 1953 |
| 2,770,145 | Stibitz | Nov. 13, 1956 |
| 2,799,171 | Stibitz | July 16, 1957 |
| 2,872,106 | Steele | Feb. 3, 1959 |

FOREIGN PATENTS

| | | |
|---|---|---|
| 521,471 | Great Britain | May 22, 1940 |